US012704944B2

(12) United States Patent
Dahlgren et al.

(10) Patent No.: US 12,704,944 B2
(45) Date of Patent: Aug. 11, 2026

(54) COMPUTER SOFTWARE MODULE ARRANGEMENT, A CIRCUITRY ARRANGEMENT, AND ARRANGEMENT AND A METHOD FOR IMPROVED USER INTERFACE

(71) Applicant: Telefonaktiebolaget LM Ericsson (publ), Stockholm (SE)

(72) Inventors: Fredrik Dahlgren, Lund (SE); Alexander Hunt, Tygelsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 25 days.

(21) Appl. No.: 18/024,605

(22) PCT Filed: Sep. 4, 2020

(86) PCT No.: PCT/EP2020/074862

§ 371 (c)(1),
(2) Date: Mar. 3, 2023

(87) PCT Pub. No.: WO2022/048776

PCT Pub. Date: Mar. 10, 2022

(65) Prior Publication Data

US 2024/0019990 A1 Jan. 18, 2024

(51) Int. Cl.
*G06F 3/0484* (2022.01)
*G06F 1/16* (2006.01)
(Continued)

(52) U.S. Cl.
CPC ............ *G06F 3/0484* (2013.01); *G06F 1/163* (2013.01); *G06F 3/03* (2013.01); *G06F 3/016* (2013.01); *G06F 3/16* (2013.01)

(58) Field of Classification Search
None
See application file for complete search history.

(56) References Cited

U.S. PATENT DOCUMENTS

2011/0164122 A1 7/2011 Hardacker
2011/0221874 A1 9/2011 Oh
(Continued)

FOREIGN PATENT DOCUMENTS

EP 2770403 A1 8/2014
EP 3203308 A2 8/2017

OTHER PUBLICATIONS

Bastawrous, Andrew, et al., "The Development and Validation of a Smartphone Visual Acuity Test (Peek Acuity) for Clinical Practice and Community-Based Fieldwork", JAMA Ophthalmology, vol. 133, No. 8, Aug. 2015, 1-15.

*Primary Examiner* — Toan H Vu
(74) *Attorney, Agent, or Firm* — Murphy, Bilak & Homiller, PLLC

(57) ABSTRACT

A visual data presenting arrangement (100) comprising an image presenting device (110) arranged to display visual data comprising graphical objects (105A-D) in a first manner and a controller (101) configured to: receive (510) a determination of eyewear (210) presence from a non-visual eyewear detector (112); and in response thereto adapt (540) a user interface of the visual data presenting arrangement (100) by displaying one or more of the graphical objects (105A-D) in a second manner.

26 Claims, 7 Drawing Sheets

(51) Int. Cl.

| | |
|---|---|
| ***G06F 3/03*** | (2006.01) |
| *G06F 3/01* | (2006.01) |
| *G06F 3/16* | (2006.01) |

(56) References Cited

U.S. PATENT DOCUMENTS

| | | | | |
|---|---|---|---|---|
| 2011/0228056 | A1 | 9/2011 | Okumoto | |
| 2011/0305375 | A1 | 12/2011 | Nelson et al. | |
| 2012/0026157 | A1 | 2/2012 | Unkel et al. | |
| 2012/0262477 | A1 | 10/2012 | Buchheit | |
| 2013/0235058 | A1 | 9/2013 | Jaramillo et al. | |
| 2013/0257849 | A1 | 10/2013 | Doherty et al. | |
| 2014/0121015 | A1* | 5/2014 | Massing | G07F 17/3211 463/31 |
| 2015/0261013 | A1 | 9/2015 | Dobson et al. | |
| 2016/0110846 | A1 | 4/2016 | Park et al. | |
| 2017/0032214 | A1* | 2/2017 | Krenzer | G06T 3/40 |
| 2017/0200296 | A1 | 7/2017 | Jones et al. | |
| 2017/0336864 | A1 | 11/2017 | Broz et al. | |
| 2019/0079581 | A1* | 3/2019 | Tsurumi | G06V 10/147 |
| 2019/0163268 | A1* | 5/2019 | Shin | B60K 37/00 |
| 2019/0324534 | A1* | 10/2019 | George-Svahn | G06F 3/013 |
| 2021/0405761 | A1* | 12/2021 | Canberk | G06F 3/04815 |
| 2022/0147139 | A1* | 5/2022 | Canberk | G02B 27/0172 |
| 2022/0197580 | A1* | 6/2022 | Esaki | G02B 27/0172 |
| 2022/0374137 | A1* | 11/2022 | Triverio | G06F 3/04845 |
| 2022/0375362 | A1* | 11/2022 | Canberk | G06V 20/20 |
| 2023/0100689 | A1* | 3/2023 | Chiu | G06F 3/013 345/157 |
| 2024/0168275 | A1* | 5/2024 | Feinbloom | G02B 25/004 |
| 2024/0273793 | A1* | 8/2024 | DeCharms | G06F 40/197 |

* cited by examiner

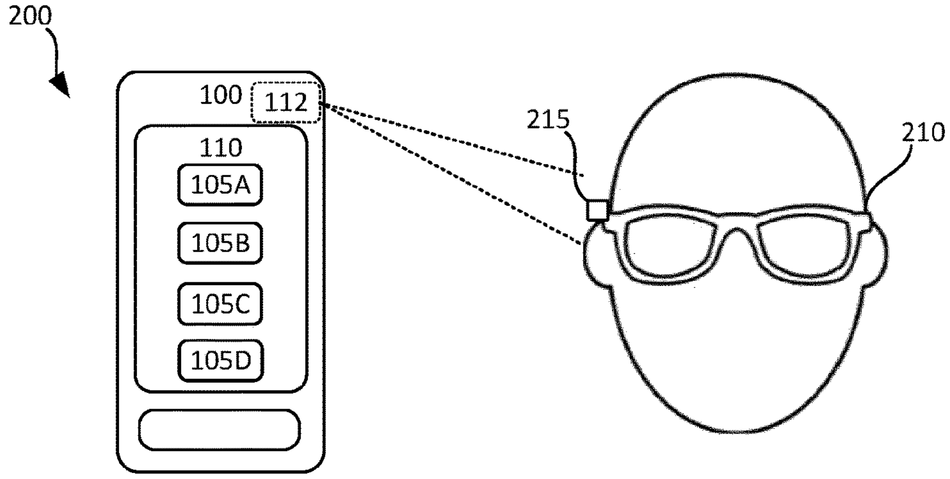
FIG. 2A
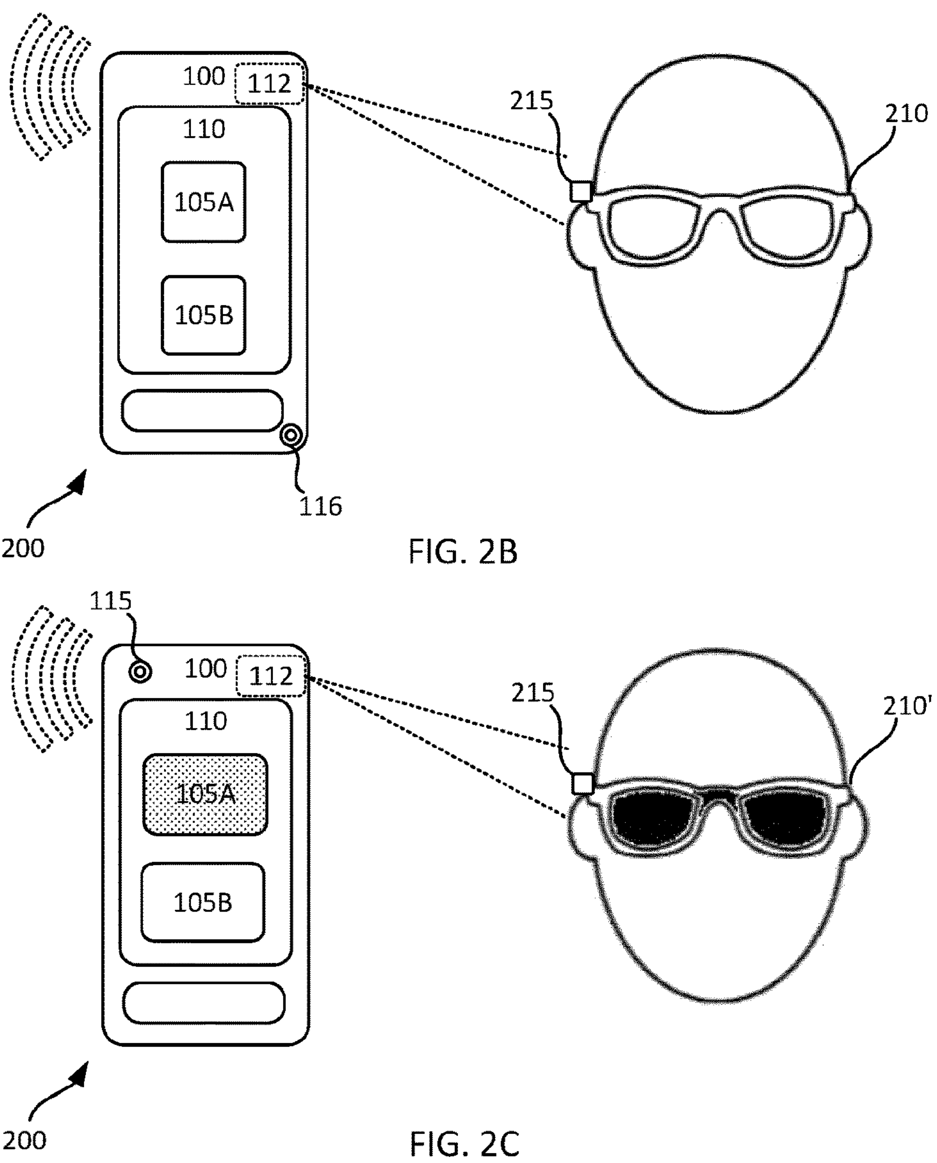
FIG. 2B
FIG. 2C

COMPUTER SOFTWARE MODULE ARRANGEMENT, A CIRCUITRY ARRANGEMENT, AND ARRANGEMENT AND A METHOD FOR IMPROVED USER INTERFACE

TECHNICAL FIELD

The present invention relates to an arrangement, an arrangement comprising computer software modules, an arrangement comprising circuits, a device and a method for providing an improved user interface, and in particular to an arrangement, an arrangement comprising computer software modules, an arrangement comprising circuits, a device and a method for providing an improved user interface adaptable to visual impairments.

BACKGROUND

Contemporary devices such as smartphones, tablet computers, wearables (watches for example) are becoming more and more advanced providing more and more functionalities to user. At the same time, the size of such devices are limited for practical reasons, thereby putting restraints on the data being presented on such devices, primarily as it relates to visual data.

In order to accommodate more and more content, the designers are enabling smaller and smaller icons or other visual representations to be used. However, this has the disadvantage that users with visual impairments may not be able to take part of the content being displayed as it is just too small.

Traditionally, there are functions available for setting the font size so that a user can set a font size or display size, i.e. resolution, that the user is comfortable with.

There are also solutions that propose to adapt contrast or brightness of the content being displayed in response to detecting that sunglasses are being worn. However, such solutions are not able to account for visual impairments and does not adapt the user interface, only the display settings of the device. Furthermore, such solutions operate based on a camera image being used to recognize whether the user is wearing sunglasses or not, and as such, are not suitable for devices that are not equipped with a camera or where the camera may not be at a user's face during operation, such as smartwatches for example.

However, as the inventors have realized, users that do not have perfect vision might have different needs. For example, some users need reading glasses when reading, especially when reading small texts. Other users might need reading glasses or terminal glasses depending on the distance from the text (a book is typically viewed closer than a computer screen). Some users need glasses for nearsightedness (below referred to as distance glasses), but as they get older they typically need to remove these to read (the stage before they actually need reading glasses).

One problem that the inventors have realized is that the setting chosen may not be usable in all circumstances. For a user that needs correction, may not need the same correction at all distances or in all circumstances. For example a nearsighted user may not have set the device to show a larger font as it is not necessary for the user being able to see well at short distances. However, the same user, when for example driving a car would wear corrective eyewear, which could possibly alter the user's vision so that the user is no longer able to see equally well at shorter distances, favoring longer distances for the safe operation of the car. In such a case, the user would need to switch glasses while driving if a navigation app for instance was to be used on the user's smartphone. As the person is being busy with their hands, this might be problematic.

Such problems are especially prominent for users above 45 years as they start to need vision compensation that might differ for different usage (distance, computer, reading). Although there are glasses being bifocal (for example distance plus reading), these can sometimes be less practical to use in certain situations and not all people feel comfortable with such glasses. Such glasses are also expensive and many times not suitable for some types of corrective eyewear. Furthermore, due to cost restrictions a user may have different prescription corrections in different eyewear. For example a user's main glasses may be bifocals while the user's sunglasses may be of a single prescription.

Other problematic situations occur, for example, during sports, when a smartwatch is being used, it might be less practical to wear certain types of glasses which would impact the overhead of using the watch. This could for example be while sailing, swimming, running, doing gymnastics, etc.

Furthermore, as the font size is increased less content may be displayed which limits the amount of content that a user can take part of or consume even in situations where the user is able to see the screen and the content. Additionally, a too large font size may be noticeable to others and thus be a source of embarrassment to a user.

Simply adapting the font size is thus not a sufficiently good solution for enabling a user to see and partake of content, especially visual, being presented on a smart device or other arrangement arranged to present visual data.

SUMMARY

An object of the present teachings is to overcome or at least reduce or mitigate the problems discussed in the background section.

According to one aspect a visual data presenting arrangement is provided, the visual data presenting arrangement comprising an image presenting device arranged to display visual data comprising graphical objects in a first manner and a controller configured to: receive a determination of eyewear presence from a non-visual eyewear detector; and in response thereto adapt a user interface of the visual data presenting arrangement by displaying one or more of the graphical objects in a second manner. The eyewear detector is non-visual in that it is not based on an image analysis.

In some embodiment the eye-wear detector is visual, and possibly based on an image analysis, especially embodiments in combinations with a second visual data presenting arrangement.

The solution may be implemented as a software solution, a hardware solution or a mix of software and hardware components.

In one embodiment the controller is further configured to register the eyewear.

In one embodiment the eyewear detector is configured to determine the presence of the eyewear by receiving an indicating signal.

In one embodiment the indicating signal is received from an identifying component on the eyewear.

In one embodiment the eyewear comprises a storage container arranged with the identifying component.

In one embodiment the indicating signal is received from another visual data presenting arrangement.

In one embodiment the controller is further configured to adapt the user interface of the visual data presenting arrangement by one or more of: adapting the number of one or more of the graphical objects being displayed; adapting the nature of one or more of the graphical objects being displayed; adapting a text of one or more of the graphical objects being displayed; adapting the arrangement of one or more of the graphical objects being displayed; by adapting the visual characteristics of one or more of the graphical objects being displayed or adapting the visual characteristics of one or more of the graphical objects being displayed.

In one embodiment the controller is further configured to adapt the text of one or more of the graphical objects being displayed by displaying an abbreviated form of the text, displaying keywords of the text, displaying the text in a different format; or any combination thereof.

In one embodiment the controller is further configured to adapt the user interface of the visual data presenting arrangement by adapting an audio component.

In one embodiment the controller is further configured to adapt the user interface of the visual data presenting arrangement by adapting a vibrator.

In one embodiment the controller is further configured to adapt the user interface of the visual data presenting arrangement by displaying the graphical objects in a corrective display.

In one embodiment the controller is further configured to adapt the user interface of the visual data presenting arrangement by adapting a device paired with the visual data presenting arrangement.

In one embodiment the controller is further configured to adapt the user interface of the visual data presenting arrangement by adapting a user interface of another visual data presenting arrangement.

In one embodiment the controller is further configured to adapt the user interface of the visual data presenting arrangement by adapting a user interface of another visual data presenting arrangement so that the user interface of another visual data presenting arrangement supplements the user interface of the visual data presenting arrangement.

In one embodiment the visual data presenting arrangement is a smartphone or a tablet computer.

According to another aspect there is provided a method for adapting a user interface of a visual data presenting arrangement comprising an image presenting device arranged to display visual data comprising graphical objects in a first manner, wherein the method comprises: receiving a determination of eyewear presence from a non-visual eyewear detector; and in response thereto adapting a user interface of the visual data presenting arrangement by displaying one or more of the graphical objects in a second manner.

According to another aspect there is provided a computer-readable medium carrying computer instructions that when loaded into and executed by a controller of a visual data presenting arrangement enables the visual data presenting arrangement to implement the method according to herein.

According to another aspect there is provided a software component arrangement for adapting a user interface in a visual data presenting arrangement, wherein the software component arrangement comprises a user interface of a visual data presenting arrangement comprising an image presenting device arranged to display visual data comprising graphical objects in a first manner, wherein the software component arrangement comprises: a software component for receiving a determination of eyewear presence from a non-visual eyewear detector; and a software component for adapting the user interface of the visual data presenting arrangement 100 by displaying one or more of the graphical objects in a second manner in response thereto.

For the context of the teachings herein a software component may be replaced or supplemented by a software module.

According to another aspect there is provided an arrangement comprising circuitry for presenting visual data according to an embodiment of the teachings herein. The arrangement comprising circuitry for presenting visual data is adapted to be used in a visual data presenting arrangement as taught herein for providing adaptation of a user interface and corresponds to the operation of the visual data presenting arrangement as discussed in the above. The visual data presenting arrangement comprising an image presenting device arranged to display visual data comprising graphical objects in a first manner and circuitry for adapting a user interface comprising: circuitry for receiving a determination of eyewear presence from a non-visual eyewear detector; and circuitry for adapting the user interface of the visual data presenting arrangement 100 by displaying one or more of the graphical objects in a second manner in response thereto.

Further embodiments and advantages of the present invention will be given in the detailed description. It should be noted that the teachings herein find use in smartphones, smartwatches, tablet computers, media devices, and even in vehicular displays.

BRIEF DESCRIPTION OF THE DRAWINGS

Embodiments of the invention will be described in the following, reference being made to the appended drawings which illustrate non-limiting examples of how the inventive concept can be reduced into practice.

FIG. 2A shows a schematic view of visual data presenting arrangement system having a user interface according to one embodiment of the teachings herein;

FIG. 2B shows a schematic view of the visual data presenting arrangement system of FIG. 2A wherein the user interface has been adapted according to one embodiment of the teachings herein;

FIG. 2C shows a schematic view of visual data presenting system of FIG. 2A and possibly of FIG. 2B wherein the user interface has been adapted according to one embodiment of the teachings herein;

DETAILED DESCRIPTION

Figure 1A:
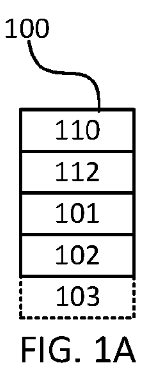
FIG. 1A shows a schematic view of a visual data presenting arrangement according to an embodiment of the present invention.

FIG. 1A shows a schematic view of a visual data presenting arrangement 100 according to an embodiment of the present invention. The visual data presenting arrangement 100 comprises a controller 101, an eyewear detector 112, a memory 102 and an image presenting device 110. In one embodiment, the visual data presenting arrangement 100 also comprises a communication interface 103.

The controller 101 is configured to control the overall operation of the visual data presenting arrangement 100. In one embodiment, the controller 101 is a general purpose controller. As a skilled person would understand there are many alternatives for how to implement a controller, such as using Field-Programmable Gate Arrays circuits, ASIC, GPU, etc. in addition or as an alternative. For the purpose of this application, all such possibilities and alternatives will be referred to simply as the controller 101.

It should also be noted that in one embodiment, parts of or all of the processing of the controller is performed remotely, where a local controller 101 is configured to provide input data to a remote processing unit, such as in a cloud server, causing the remote processing unit to perform the processing and receiving the results of such processing as output from the remote processing unit. For the purpose of this application, such possibilities and alternatives will also be referred to simply as the controller 101, the controller thus representing both the local controller and the remote processing unit.

The memory 102 is configured to store graphics data, User Interface (UI) settings and computer-readable instructions that when loaded into the controller 101 indicates how the visual data presenting arrangement 100 is to be controlled. The memory 102 may comprise several memory units or devices, but they will be perceived as being part of the same overall memory 102. There may be one memory unit for the image presenting device storing graphics data, one memory unit for the eyewear detector storing settings, one memory for the communications interface (if such is present) for storing settings, and so on. As a skilled person would understand there are many possibilities of how to select where data should be stored and a general memory 102 for the visual data presenting arrangement 100 is therefore seen to comprise any and all such memory units for the purpose of this application. As a skilled person would understand there are many alternatives of how to implement a memory, for example using non-volatile memory circuits, such as EEPROM memory circuits, or using volatile memory circuits, such as RAM memory circuits. For the purpose of this application all such alternatives will be referred to simply as the memory 102.

The image presenting device 110 is in one embodiment a display arrangement comprising one or more displays arranged to present visual data, predominantly through images. In one such embodiment, the image presenting device 110 is a touch screen thereby enabling for user input to be provided to and received by the visual data presenting arrangement 100. The visual data is related to the user interface of the visual data presenting arrangement and to the content being presented by the visual data presenting arrangement 100. The visual data presenting arrangement 100 is thereby arranged to present (visual) content through a (graphical) user interface in a manner controller by the controller 101.

The eyewear detector 112 is arranged to detect eyewear (not shown in FIG. 1A, but referenced 210 in FIG. 2A for example) that is (to be) worn by a user. In one embodiment, the eyewear detector is a camera module arranged to provide an image (or stream of images) of the user as the user is utilizing the visual data presenting arrangement 100, wherein the images of the user may be analyzed using image analysis techniques known in the art, to determine whether the user is wearing eyewear or not. However, such an embodiment requires that the camera is arranged to face the user and able to capture a clear image of the user's face. This thus requires a special camera to be installed and that also environmental factors are optimal for capturing a good-enough image to be analyzed of the user's face.

To overcome such shortcomings the inventors are proposing to utilize an active identifying manner. The inventors are thus proposing to utilize a non-visual eye-wear detector to overcome such shortcomings, i.e. a sensor or such not relying on visual inputs such as an image to be analyzed. In one embodiment, the eyewear detector 112 is a detector arranged to detect an identifying signal being transmitted from the eyewear. Based on the identifying signal, the eyewear detector 112 is arranged to determine whether the user is wearing eyewear or not. In one embodiment the eyewear detector 112 is arranged based on a communication standard. In one such embodiment, the eyewear detector 112 is arranged based on a close-range communication standard, such as Bluetooth™, RFI™ (Radio Frequency Identifier), ZigBee™ to mention a few examples or other non-standard interfaces.

As a skilled person would understand the visual data presenting arrangement 100 may comprise one controller 101 and the eyewear detector 112 may comprise one controller, but for the purpose of the teachings herein, they will be considered to be the same controller 101 in order to cover all possible variations of exactly where the determination whether the user is wearing eyewear or not takes place.

In one embodiment, as illustrated in FIG. 1A, the eyewear detector 112 is comprised within the smart device 100. In an alternative embodiment the eyewear detector 112 is arranged remotely to the smart device 100, but being comprised in the smart device 100, by being connected to the smart device 100.

The controller 101 is configured to receive a determination that the user is wearing (or about to wear) eyewear, and in response thereto adapt the manner in which the (visual) content is presented through the (graphical) user interface.

It should be noted that the visual data presenting arrangement 100 may comprise a single device or may be distributed across several devices and apparatuses.

It should be noted that the teachings herein find use in visual data presenting arrangements 100 in many areas of image presentation for example smart phones, tablet computers, smart watches, media devices (such as smart TVs) or even vehicular displays to mention a few examples. In one embodiment the visual data presenting arrangement 100 is a smart device.

Figure 1B:
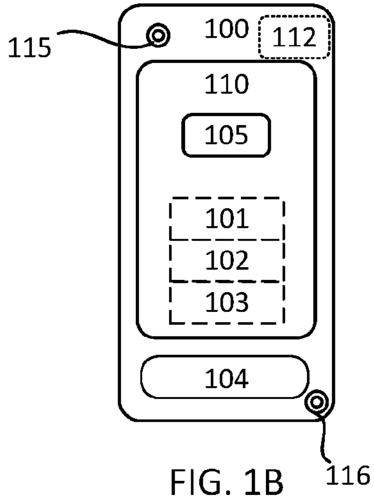
FIG. 1B shows a schematic view of a visual data presenting arrangement according to an embodiment of the present invention.

FIG. 1B shows a schematic view of a visual data presenting arrangement 100 being a smart device 100 according to an embodiment of the present invention. In this embodiment, the smart device 100 is a smartphone or a tablet computer. In such an embodiment, the smart device 100 comprises a touchscreen 110 arranged to display visual content 105. The smart device 100 also comprises one or more input elements. The input elements may be physical such as keys or buttons 104. Alternatively or additionally, the input elements are virtual, such as visual icons 105 that are displayed and selectable on the touchscreen 110.

In one embodiment the smart device 100 is also arranged with an audio interface 115. The audio interface 115 comprises a loudspeaker for providing audio output, such as presenting visual data by reading it out loud, for example through so-called text-to-speech (TTS) synthesis. The audio interface 115 may also comprise a microphone for providing audio input, such as voice commands.

In one embodiment the smart device 100 is also arranged with a vibrator 116. The vibrator 116 may be utilized to provide information such as alerts or status information to the user.

Figure 1C:
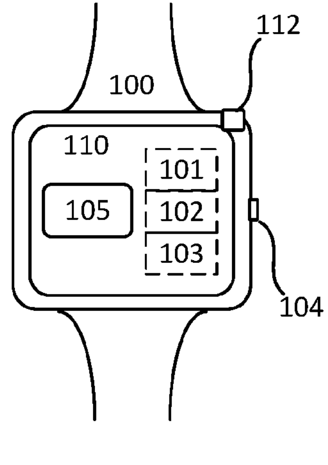
FIG. 1C shows a schematic view of a visual data presenting arrangement according to an embodiment of the present invention.

FIG. 1C shows a schematic view of a visual data presenting arrangement being smart device 100 according to an embodiment of the present invention. In this example, the smart device 100 is a smart watch to be worn by a user. Typically, the display arrangement 110 of a smart watch is smaller than the display arrangement 110 of a smart phone, the smart watch thus being more limited in what visual content that may be displayed. The smart watch 100 also comprises one or more input elements. The input elements may be physical such as keys or buttons 104. Alternatively or additionally, the input elements are virtual, such as visual icons 105 that are displayed and selectable on display arrangement being a touchscreen 110.

The visual data presenting arrangement 100 as exemplified in either of FIGS. 1A, 1B or 1C may be arranged with a communication interface 103. The communication interface 103 is arranged to enable communication with other devices, such as other smart devices 100 or a server (not shown) for receiving content, instructions and/or settings or other data.

The communication interface 103 may be wired and/or wireless. The communication interface may comprise several interfaces.

In one embodiment the communication interface 103 comprises a USB (Universal Serial Bus) interface. In one embodiment the communication interface 103 comprises a HDMI (High Definition Multimedia Interface) interface. In one embodiment the communication interface 103 comprises a Display Port interface. In one embodiment the communication interface 103 comprises an Ethernet interface. In one embodiment the communication interface 103 comprises a MIPI (Mobile Industry Processor Interface) interface. In one embodiment the communication interface comprises an analog interface, a CAN (Controller Area Network) bus interface, an I2C (Inter-Integrated Circuit) interface, or other interface.

In one embodiment the communication interface 103 comprises a radio frequency (RF) communications interface. In one such embodiment the communication interface 103 comprises a Bluetooth™ interface, a WiFi™ interface, a ZigBee™ interface, a RFID™ (Radio Frequency IDentifier) interface, Wireless Display (WiDi) interface, Miracast interface, and/or other RF interface commonly used for short range RF communication. In an alternative or supplemental such embodiment the communication interface 103 comprises a cellular communications interface such as a fifth generation (5G) cellular communication interface, an LTE (Long Term Evolution) interface, a GSM (Global Systeme Mobile) interface and/or other interface commonly used for cellular communication. In one embodiment the communication interface 103 is configured to communicate using the UPnP (Universal Plug n Play) protocol. In one embodiment the communication interface 103 is configured to communicate using the DLNA (Digital Living Network Appliance) protocol.

In one embodiment, the communication interface 103 is configured to enable communication through more than one of the example technologies given above. As an example, a wired interface, such as MIPI could be used for establishing an interface between the display arrangement, the controller and the user interface, and a wireless interface, for example WiFi™ could be used to enable communication between the visual data presenting arrangement 100 and an external host device (not shown).

The communications interface 103 may be configured to enable the visual data presenting arrangement 100 to communicate with other devices, such as other visual data presenting arrangements 100 and/or smartphones, Internet tablets, computer tablets or other computers, media devices, such as television sets, gaming consoles, video viewer or projectors (not shown), or eyewear detectors for receiving data.

In embodiments where the eyewear detector 112 is arranged based on a communication standard, the eyewear detector may be part of the communication interface 103.

In the following, simultaneous reference will be made to the visual data presenting arrangements 100 of FIGS. 1A, 1B and 1C.

FIG. 2A shows a schematic view of a visual data presenting system 200 according to the teachings herein. The visual data presenting system 200 comprises one or more visual data presenting arrangements 100. In this example one visual data presenting arrangement 100 is shown exemplified by a smart device 100 as disclosed in relation to FIG. 2B, being a smartphone 100. The smartphone 100 is in this example arranged to present visual data comprising four graphical objects (such as icons) 105A, 105B, 105C, 105D. As would be understood, the nature, the number, the extent and the arrangement of the displayed graphical objects as shown in FIG. 2A is only for illustrative purposes and may vary greatly as regards the nature, the number, the extent and the arrangement of the displayed graphical objects. The graphical objects 105A-D are thus displayed in a first (original) manner). For the purpose of this example and for illustrative purposes, the graphical objects data 105 are considered to provide a graphical user interface for the smartphone 100.

Also shown in FIG. 2A is eyewear 210 to be or being worn by a user. In the example of FIG. 2A, the user is wearing the eyewear 210.

As discussed in relation to FIG. 1A, the visual data presenting arrangement 100, i.e. the smartphone 100 is arranged through the eyewear detector 112 to determine whether there are eyewear (worn or to be worn) present or not. In the illustrative example of FIG. 2A this is indicated by the dotted lines reaching from the eyewear detector 112 to the eyewear 210.

As is also discussed in relation to FIG. 1A, the eyewear detector 112 may determine whether eyewear 210 is worn by the user through image analysis of images captured by the eyewear detector being a camera 112. Alternatively or additionally, the eyewear detector 112 may determine whether eyewear 210 is worn by the user through receiving an identifying signal identifying the eyewear 210. In one embodiment, the identifying signal is received from an identifying component 215 arranged on or in the eyewear 210 through a communication standard. In such an embodiment, the identifying component 215 is arranged based on a matching communication standard as the eyewear detector 112. The eyewear detector 112 may thus operate both on an image analysis and on a received signal.

In one embodiment the identifying component 215 is arranged to determine that the eyewear 210 is being worn through sensors being activated, the sensors considered as part of the identifying component 215. In one example the sensor(s) is a proximity sensor, such as a capacitive sensor or a pressure sensor.

As it has been determined that eyewear 210 is worn (or to be worn) by the user, which from now on will be referred to as eyewear being present, the controller is configured to adapt the manner in which the graphical objections 105 are displayed or presented, or, in other words, to adapt the (graphical) user interface 105 of the smart phone 100.

It should be noted that the controller may not only configured to adapt the (graphical) user interface 105 of the smart phone 100 when eyewear is present. In one embodiment the controller is configured to adapt the (graphical) user interface 105 of the smart phone 100 when eyewear is not present. This enables the smart device 100 to switch between two (or more) user interfaces (for example a first and a second user interface) depending on whether the user is wearing (or about to wear) eyewear or not. The controller is thus configured to determine the present eyewear status or that the presence of eyewear has changed and adapt the user interface accordingly.

FIG. 2B shows a schematic view of the visual data presenting system 200 of FIG. 2A wherein the (graphical) user interface 105 has been adapted according to the teachings herein. As is noted above, and as would be understood, the nature, the number, the extent and the arrangement of the displayed graphical objects 105 as shown in FIG. 2B is only for illustrative purposes and may vary greatly as regards the nature, the number, the extent and the arrangement of the displayed graphical objects. However, as is illustrated in FIG. 2A and FIG. 2B and as is apparent from a comparison of the two figures, the (graphical) user interface 105 has been adapted and is not the same. For example, the smartphone 100 of FIG. 2A displays four graphical objects 105A-D, whereas the smartphone 100 of FIG. 2B displays only two graphical objects 105A-B. Furthermore, the smartphone 100 of FIG. 2B displays the two graphical objects 105A-B as having a larger extent than the corresponding graphical objects 105A-B of FIG. 2A. By reducing the number of graphical objects to be displayed, space is freed up allowing the graphical objects 105 to be displayed at a size or extent that is larger than an unadapted or original size. By thus adapting the (graphical) user interface so that only the most important or most prioritized objects 105 are displayed, the user interface is enabled to ensure that the user is at least made aware of those graphical objects 105.

The graphical objects are thus displayed in a second (adapted) manner.

The controller is, in one embodiment, configured to adapt the (graphical) user interface in the second (adapted) manner by adapting the number of the graphical objects 105 being displayed.

The controller is, in one alternative or additional embodiment, configured to adapt the (graphical) user interface in the second (adapted) manner by adapting the nature of the graphical objects 105 being displayed, i.e. to adapt what types of graphical objects that are to be displayed and which graphical objects that are to be displayed. For example, the structure of a menu system could be altered depending on the eye wear being worn.

The controller is, in one alternative or additional embodiment, configured to adapt the (graphical) user interface in the second (adapted) manner by adapting the extent (form or size) of the graphical objects 105 being displayed. In relation to adapting the extent of a graphical object 105, any text displayed within the graphical object or as part of the graphical object 105 may also be adapted in a corresponding manner. In one embodiment, the text is adapted by changing its size to correspond to the change in the extent of the graphical object. In one embodiment, the text is adapted by changing the actual text, i.e. changing the content of the text. If a graphical object is displayed with a text (for example: "Meeting on Thursday at 10:00 am with Jane Doe, Jim Smith and Jeff Hart"), the text may be adapted so that only the initial part is displayed (for example: "Meeting"), that an abbreviated form (where abbreviations are used to replace original wording) is displayed (for example: "Meet Thu 10 am J Doe, J Smith J Hart"), that only keywords are displayed (for example: "Meeting Thu 10 am Jane Doe et al") or a combination of any, some or all of these options and possibly other variations of shortening a text (for example: "Th 10 am J Doe"). The shortening of the text may be based on a semantic analysis of the text for providing a shorter text that is equal as it comes to content. The shortening of the text may also be adapted by adapting a color scheme or other display property of the graphical icon. For example, a "To Do" application arranged to display graphical icons for meetings (for example: "Meeting on Thursday at 5:00 pm with Jane Doe, Jim Smith and Jeff Hart"), tasks (for example: "Review P809765-X") and deadlines (for example: "File P809765-X by 20201212"), may adapt the graphical object 105 and the text by changing the color scheme of the graphical object to indicate the type of text displayed thereby conveying the same information but with a shorter text. In the examples given different colors (of text, for a frame of the graphical object or other part of the graphical object, possibly all of the graphical object 105) could be used to indicate type of notification, wherein the texts become [GREEN]"Thu 17 J Doe", [BLUE]"P809765-X") and [RED]"File P809765-X 12/12"). As can be seen in these examples, the controller may be further configured to adapt the formatting of the text to be displayed. In these examples the time "5:00 pm" has been changed to a 24 hour format; "17", and the date "20201212" has been changed to the shorter format "12/12" leaving out the year assuming that the user knows which year the deadline relates to. If not, the user can always get all information by selecting and opening the graphical object 105, so no information is lost.

The controller is, in one alternative or additional embodiment, configured to adapt the (graphical) user interface in the second (adapted) manner by adapting the arrangement (placement) of the graphical objects 105 being displayed.

The controller is, in one alternative or additional embodiment, configured to adapt the (graphical) user interface in the second (adapted) manner by adapting the visual characteristics (color, brightness, contrast, background, intensity to name a few examples) of the graphical objects 105 being displayed.

In one embodiment, where the smart device 100 is arranged with an audio interface 115, the controller is further configured to provide audio output corresponding to one or more of the graphical objects 105A-D. The audio output may correspond to a previously displayed graphical object 105C, 105D and/or it may relate to a currently displayed graphical object 105A, 105B. The audio output may be to read out data displayed in the graphical object 105A-D or to provide a status indicated by the graphical object 105A-D.

In one such embodiment, where the smart device 100 is arranged with an audio interface 115, the controller is further configured to enable (or alternatively to disable) audio input for commands (i.e. voice control) as it is determined that the presence of eyewear has changed. The graphical user interface is thus changed to not only being graphical, but to also being audio-based (or vice-versa).

The controller is thus configured to adapt an audio component 115 of the user interface depending on the determination of the eyewear presence.

In one embodiment, where the smart device 100 is arranged with a vibrator 116, the controller is further configured to provide vibrating output corresponding to one or more of the graphical objects 105A-D for conveying some of the data of the graphical object 105 A-D. The vibrating output may provide a status indicated by the graphical object 105A-D.

The controller is thus configured to adapt a vibrator 116 of the user interface depending on the determination of the eyewear presence.

The controller is, in one alternative or additional embodiment where at least one of the graphical objects 105A-D relate to a virtual keyboard or keypad (considered to be different types of keyboards for the context of this application), configured to adapt the (graphical) user interface in the second (adapted) manner by adapting the arrangement of the virtual keyboard. In one such embodiment, the virtual keyboard is adapted to be of a different type, for example switching from a QWERTY style keyboard to an ITU-T keypad. In one alternative or additional such embodiment, the virtual keyboard is adapted to be displayed partially, wherein a user is enabled to scroll the keyboard to reveal the parts not presently displayed.

The controller is, in one alternative or additional embodiment, configured to adapt the (graphical) user interface in the second (adapted) manner by adapting the manner in which the graphical objects 105 are being displayed to display the graphical objects in a so-called corrective display. Corrective displays are arranged to display graphics in a manner that compensates for any visual impairment so that the user perceives the content correctly even when not wearing the prescribed eyewear.

As discussed above, the inventors have further realized that a user may have different eyewear that may have different prescriptions. An adaptation suitable for one eyewear may thus not be suitable for another eyewear.

FIG. 2C shows a schematic view of the visual data presenting system 200 of FIG. 2A and possibly of FIG. 2B wherein the user is wearing a second pair of eyewear 210' having a different prescription (compared to the eyewear of FIGS. 2A and 2B) and wherein the (graphical) user interface 105 has been adapted according to the teachings herein. In an embodiment as in FIG. 2C, eyewear detector 112 is thus configured to not only determine a presence of eyewear, but also determine an identity or type of the eyewear for which the presence is determined, wherein the controller 101 is configured to adapt the user interface according to an identity of the eyewear 210.

In one such embodiment, the eyewear detector 112 is configured to determine the type of eyewear based on an image analysis. Such an image analysis is beneficial in differentiating between two visually different eyewear, such as for example daylight glasses and sunglasses.

In an alternative or additional such embodiment, the eyewear detector 112 is configured to determine the type of eyewear based on the received signal, wherein the received signal indicates the identity and/or the type of eyewear.

As can be seen in FIG. 2C compared to FIGS. 2A and 2B, the user interface has been adapted in a different manner, wherein the visual appearance as well as the size of the graphical objects 105A-B is different in FIG. 2C compared to FIG. 2B.

In the above, the focus of the eyewear has been on glasses, but as the inventors have realized, the same problems are present also for other types of eyewear, such as contact lenses, which presence may be more difficult to determine.

Figures 3, 4A, 4B:
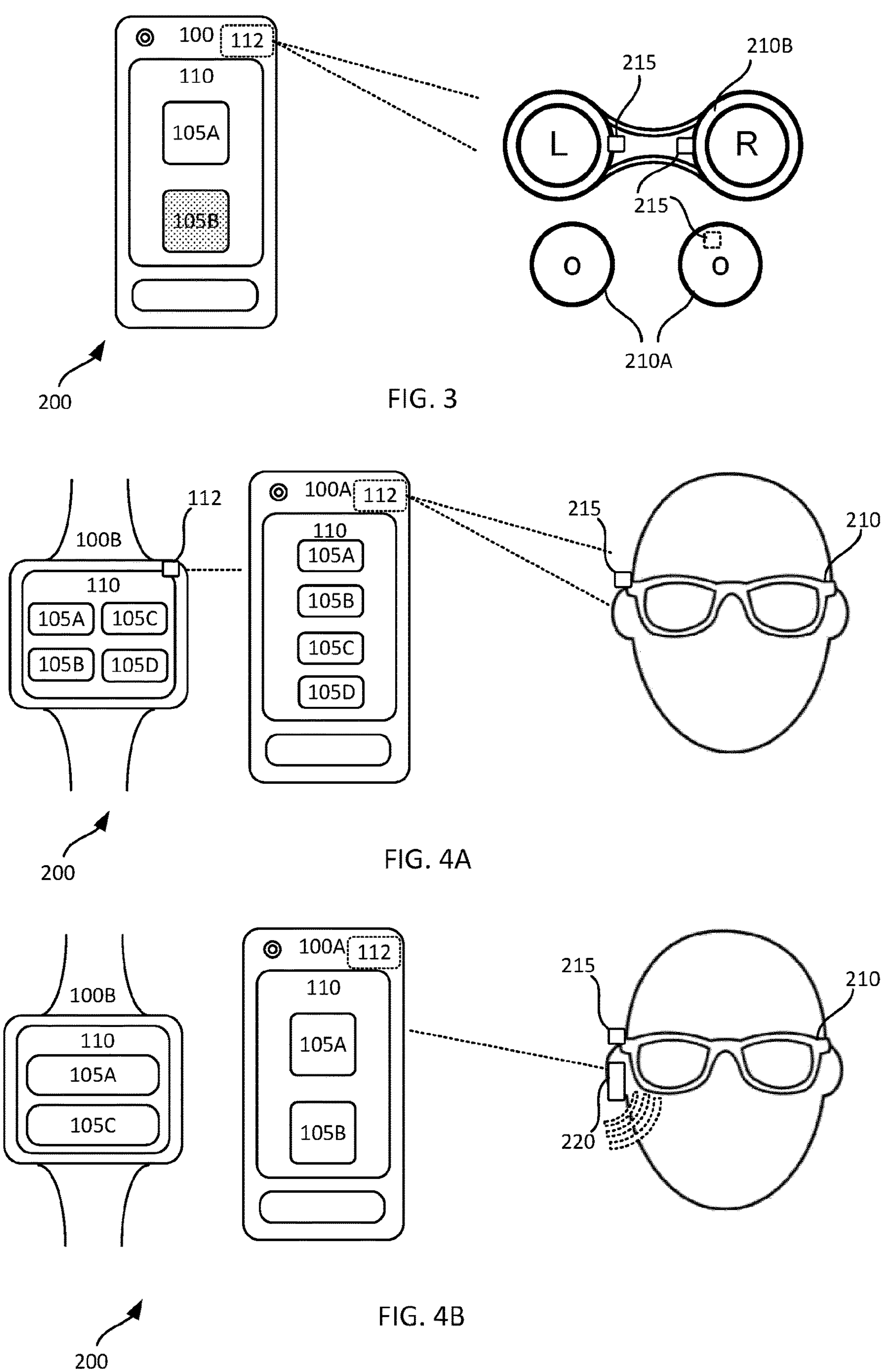
FIG. 3 shows a schematic view of visual data presenting arrangement system according to one embodiment of the teachings herein.
FIG. 4A shows a schematic view of visual data presenting arrangement system having a user interface according to one embodiment of the teachings herein.
FIG. 4B shows a schematic view of the visual data presenting arrangement system of FIG. 4A wherein the user interfaces have been adapted according to one embodiment of the teachings herein.

FIG. 3 shows a schematic view of the visual data presenting system 200 similar to those of FIGS. 2A, 2B and 2C, wherein the eyewear 210 is contact lenses and wherein the (graphical) user interface 105 has been adapted according to the teachings herein. In this example the eyewear 210 comprises the actual eyewear (i.e. the contact lenses) 210A and a case or storage container 210B for the eyewear.

As contact lenses are difficult to detect through image analysis (other than colored contact lenses), the eyewear detector 112 is configured to determine the presence of the eyewear 210 by receiving a signal from an identifying component 215 arranged on or in the storage container 210B. To enable detection or determination of the actual presence of the eyewear 210 it is not sufficient to detect a presence of the storage container 210B, but also—as the inventors have realized—to determine whether the contact lenses (or other eyewear being stored therein) 210A has been retrieved (or put back) by determining whether the storage container 210B is being opened. The identifying component 215 is therefore arranged on the storage container 210B so that it emits the signal as the storage container is being opened (and/or being closed).

For disposable lenses it is easy to determine that the lenses are present when the storage container is opened.

For non-disposable lenses, the determination may be based on keeping account of each time the storage container is opened (and/or closed) to keep track of if the lenses have been retrieved or put back.

In one embodiment, where the identifying component 215 is made very small, the identifying component 215 may be arranged on the actual contact lenses 215A. For example a small marker may be comprised in the contact lens, such as through printing or molding. Electronic markers are also foreseeable to be utilized in contact lenses and may be used for identifying them as for any type of eye wear.

For implementations where the identifying component 215 is unable to generate a signal strong enough to be emitted to the eyewear detector 112, the identifying component 215 may comprise two parts, one arranged on the contact lenses and one on the storage container 215B, the part arranged on the storage container 210B then being arranged to detect the presence of the contact lenses 210A based on the signal received from the part of the identifying component 215 arranged on the contact lenses 210A and to forward such a signal to the eyewear detector 112.

As indicated above in relation to FIG. 1A, the memory 102 is arranged to store settings. The memory may thus be arranged to store settings for how to adapt the user interface for a determined eyewear, such as by storing settings for an identified eyewear 210. A default setting is also stored for use when no eyewear is present. Vice versa, a default setting may be stored for use when eyewear is present, and the adaptation is performed when the default eyewear is not present.

In one embodiment, the eyewear 210 comprises a combination of eyewear, for example a pair of sunglasses 210' worn over contact lenses 210A or reading glasses over contact lenses. The eyewear detector 112 is thus, in one embodiment, arranged to determine the presence of one or more eyewears 210. The presence of one eyewear 210 may be determined in one of the manners disclosed herein, while the presence of another eyewear 210A may be determined in another of the manners disclosed herein. The controller may thus be arranged to receive two identities of eyewear from the eyewear detector 112, and to adapt the (graphical) user interface 105 accordingly. In one embodiment a combination of two or more eye wears would be considered to be an eye wear of its own.

In one embodiment, the user interface 105 is adapted according to a combined identity for which a stored setting is available. In an alternative or additional embodiment, the user interface 105 is adapted according to a combination of stored settings that are available for the identities.

FIG. 4A shows a schematic view of a visual data presenting system 200, such as those of FIGS. 2A, 2B, 2C and 3, wherein the visual data presenting system 200 comprises a further smart device 100B according to herein. The visual data presenting system 200 of FIG. 4 thus comprises a first smart device 100A, possibly as in FIGS. 2A, 2B, 2C and 3, and a second smart device 100B. The second smart device 100B may be any type of smart device as discussed in relation to FIGS. 1A, 1B and 1C. In the example of FIG. 4A, the second smart device 100B is a smart watch as disclosed in relation to FIG. 1C. In the example of FIG. 4A, the first smart device is displaying four graphical objects 105A-D. So is the second smart device 100B. However, it should be noted that this is only an illustrative example and the first and second smart devices need not display the same graphical objects 105A-D.

In the example of FIG. 4A, the first smart device 100A determines that eyewear 210 is present by the eyewear detector 112 of the first device 100A detecting the eyewear 210. The eyewear detector 112 may detect the eyewear through any manner disclosed herein for example through receiving a signal and/or through image analysis. The second smart device 100B also determines that eyewear 210 is present by the eyewear detector 112 of the second device 100B detecting the eyewear 210. However, assuming that the eyewear is out of range and/or out of sight for the eyewear detector 112 of the second smart device 100B, the eyewear detector 112 of the second smart device 100B may determine the presence of the eyewear 210 by receiving a signal thereto from the first smart device 100A. This is indicated by the dotted line between the first smart device 100A and the second smart device 100B in FIG. 4A.

The controller 101 of the first smart device 100A is thus configured to transmit a signal indicating the detected or determined presence of eyewear as such presence is determined. The controller 101 is in one embodiment configured to transmit the signal to other smart devices 100 (or other devices) that it is paired to, if paired to any. In such an embodiment the controller 101 is thus configured to determine if the smart device 100A is paired to another device, possibly a smart device 100, and if so, transmit the signal to the paired device(s). In an alternative or additional embodiment the controller 101 is in one embodiment configured to transmit the signal to other smart devices 100 by broadcasting the signal.

In one embodiment, the signal indicates the identity (or type) of the eyewear 210 for which the presence is determined and the controller of the smart device receiving the signal, in this example the second smart device 100B thus adapts the user interface as if the second smart device determined the presence of the eyewear 210 itself.

In one embodiment, the signal indicates the adaptations to be performed for the determine eyewear, wherein the controller of the smart device receiving the signal, in this example the second smart device 100B, thus adapts the user interface as indicated by the signal received from the sending smart device, in this example the first smart device 100A. The controller 101 is thus further configured in such an embodiment, to determine how the (graphical) user interface 105 of another smart device 105 is also to be adapted.

The two smart devices 100A, 100B of FIG. 4A are thus in a communicative connection with each other. This allows for the user interfaces 105 of the two (or more) smart devices 100 to be adapted in a manner so that they supplement each other. For such an embodiment where the controller 101 of the first smart device 100A determines how the user interface 105 of the second smart device 100B is to be adapted, the controller 101 (simply) adapts the two user interfaces 105 so that they supplement each other. For an embodiment, where the controller 101 of the first smart device 100A adapts the user interface of the first smart device 100A and the controller 101 of the second smart device 100B adapts the user interface of the second smart device 100B, the controllers 101 of the two smart devices may cooperate to generate settings for how to adapt the user interfaces 105 so that they supplement each other.

As a skilled person would understand the two smart devices 100A, 100B may also adapt their respective user interfaces independently of one another.

FIG. 4B shows a schematic view of the visual data presenting arrangement system of FIG. 4A wherein the user interfaces 105 have been adapted according to one embodiment of the teachings herein. As discussed above, in the example of FIG. 4A, the both the first smart device 100A and the second smart device 100B are displaying four graphical objects 105A-D. However, in the example of FIG. 4B, the first smart device 100A has adapted its (graphical) user interface 105 to display two graphical objects 105A, 105B. The manner in which these graphical objects are displayed has also been adapted as indicated in FIG. 4B. The adaptation may be in any manner as disclosed herein. Furthermore, in the example of FIG. 4B, the second smart device 100B has also adapted its (graphical) user interface 105 to display two graphical objects 105A, 105C. The displayed user interfaces of FIG. 4B is thus simplified and irrelevant objects may have been removed to more clearly convey important or relevant information more clearly. The manner in which these graphical objects are displayed has also been adapted as indicated in FIG. 4B. The adaptation may be in any manner as disclosed herein. In this example, the first smart device 100A are assumingly displaying the most used (or other manner of prioritizing objects) first and second graphical objects 105A and 105B. Assuming that also the third graphical object 105C is a prioritized graphical object 105, but there is no room for displaying it o the first smart device 100A, the teachings taught herein provides for a manner of displaying it still, by adapting the (graphical) user interface 105 of the second smart device 100B so that it supplements the (graphical) user interface 105 of the first smart device 100A. In this example the (graphical) user interface 105 of the second smart device 100B has been adapted to display the third graphical object 105C, thereby supplementing the (graphical) user interface 105 of the first smart device 100A. Assuming further that the first graphical object 105A is the most prioritized graphical object, the (graphical) user interface 105 of the second smart device 100B has been further adapted to also display the first graphical object 105A.

It should be noted that the (graphical) user interface 105 of the second smart device 100B could also have been further adapted to also display the fourth graphical object 105D.

The two (or more) smart devices 100A and 100B are thus configured to adapt their user interfaces individually or to supplement each other. In embodiments where they are arranged to supplement each other, they may be arranged to share the graphical objects to be displayed, or to selectively display graphical objects according to some sort of prioritization in a manner that supplements each other.

As is seen in FIGS. 4A and 4B for example, the user interfaces may be adapted to be simplified by reducing the complexity for the alternative UI (when reading glasses are not worn for example), which could in one embodiment be done by removing irrelevant icons (i.e. the actual notification content might be more or less intact, but irrelevant objects be removed) or by simplifying the message being shown (less text, less information, no or simplified image, etc.). When the complete content is not shown, this could be indicated by a graphical indicator, for example a red border on the display to indicate to the user that there is more information—if the user changes the eyewear setting (e.g. lifting the distance glasses or taking on reading glasses) the user will be enabled to see more info as the user interface may adapt accordingly. Then the user is offered an opportunity in a non-intrusive manner. For example, if the user is swimming, the user might choose to wait or ignore the content. If the user is walking on the street, and the content seems important, the user might stop to put on reading glasses.

In one example one device may be adapted to show graphic content, while another device may be adapted to show textual content. A user may thus chose which content to view by choosing to view a certain device.

As can also be seen in the example of FIG. 4B, the visual data presenting system 200 may comprise further devices, such as a device 220. The further devices 220 are devices to be paired with one of the smart devices 100, and may thus be seen as parts or components of such smart devices. In this example the device 220 is a headset, for example a Bluetooth™ headset paired with the first smart device 100A.

The controller 101 of the first smart device 100A is thus, in one embodiment, configured to adapt the (graphical) user interface 105, by adapting the operation of such devices 220. The adaptation is in one embodiment achieved by the first smart device 100A signaling commands to the device 220, the commands to be executed by the device 220. In FIG. 4B this is indicated by the dotted line between the first smart device 100A and the device 220.

In this example, where the device 220 is a Bluetooth™ headset, the (graphical) user interface 105 of the first smart device 100A may thus be configured by activating(/deactivating) audio input (and/or output) through the Bluetooth™ headset 220. The command may simply be to wake up the Bluetooth™ headset 220. In this example, the Bluetooth™ headset 220 may be seen as part of the audio component 115 of the smart device 100.

As various such devices are commonly known and as they may be seen as part of the smart device they are paired with, they need no further description.

The user interface 105 is referenced as partially graphical herein (indicated by "graphical" being within parenthesis) as the user interface is mainly graphical—at least the adaptations are mainly to the graphical aspects of the user interface. However, as some of the adaptations are related to using non-graphical parts of the user interface, the user interface is considered to mainly relate to the graphical aspects but also include such components that are adapted to supplement the graphical user interface, such as the audio component.

The identity of the eyewear may be an identifier for the actual eyewear. The identity may alternatively or additional be an indicator of which type of eyewear is determined. For the context of the teachings herein the identifier will be considered an identifier of the corresponding settings to be used for the determined eyewear. For an embodiment wherein the identifier identifies a unique eyewear, the controller may be arranged to adapt the user interface for a user differently depending on exactly which eyewear is being worn.

It should be noted that the adaptation of the (graphical) user interface is not simply changing a font size, but a more complete reworking of the user interface.

Figure 5:
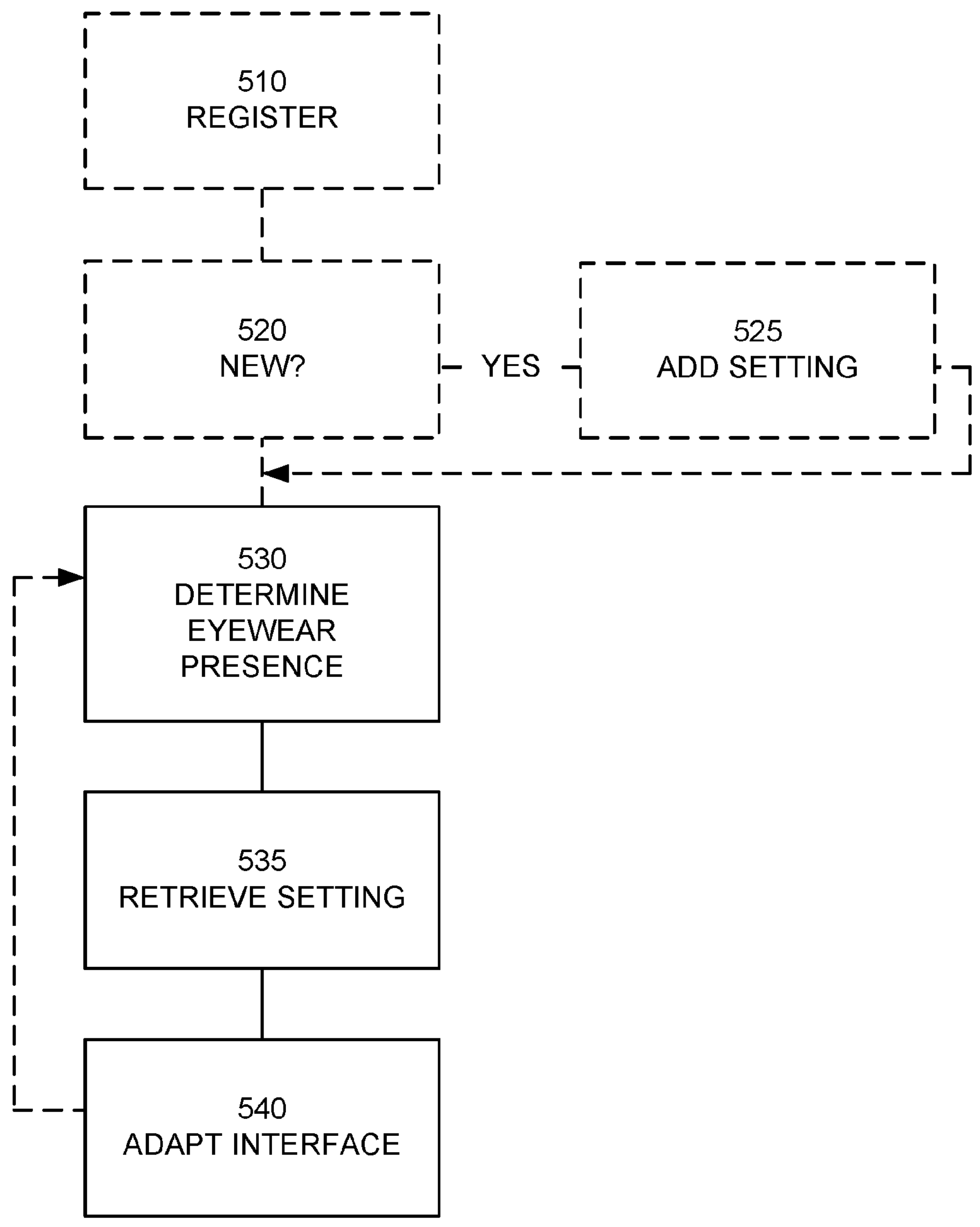
FIG. 5 shows a flowchart of a general method according to an embodiment of the present invention.

FIG. 5 shows a general flowchart for a method according to the teachings herein. The method corresponds to the operation of the visual data presenting arrangement 100 as discussed in the above.

Initially an eyewear 210 may be registered 510 for the smart device 100. If the eyewear is determined 520 to be new or of a new type (such as a new prescription) settings are received and added 525 for the eyewear 210. The settings may be received through the user interface from the user. Alternatively, the settings may be received from a server or other remote storage. The settings for the eyewear 210 are stored in the memory 102 (locally or remotely for later retrieval). A default setting may be used for specific types of eyewear and the registration of the eyewear is thus optional as indicated by the dashed lines.

During use, a change in presence for the eyewear 210 is determined 530 by the eyewear detector 112. In response thereto the settings are optionally retrieved 535 (optional as possibly a default setting is already at hand) and the interface of the smart device 100 is adapted 540. As part of the adaptation of the interface, the interface of additional devices (smart or not) may also be adapted as discussed above.

Should a new eyewear presence be determined, the method repeats as indicated by the dashed arrow going from adapting the interface 540 to the determination of the eyewear presence 530.

Figure 6:
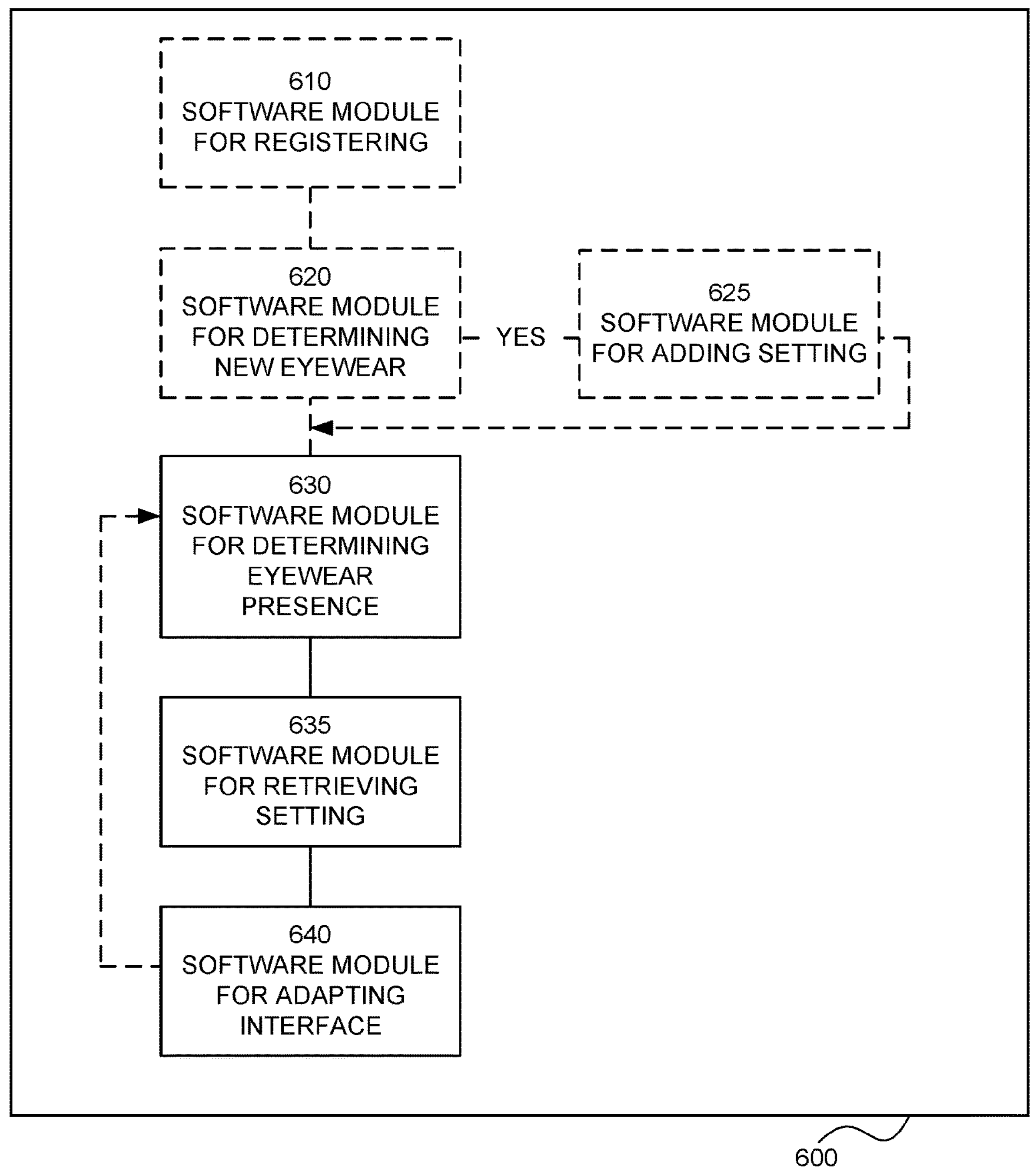
FIG. 6 shows a component view for a software component arrangement according to an embodiment of the teachings herein.

FIG. 6 shows a component view for a software component or module arrangement 600 according to an embodiment of the teachings herein. The software component arrangement 600 is adapted to be used in a visual data presenting arrangement 100 as taught herein for providing adaptation of a user interface as taught herein and corresponds to the operation of the visual data presenting arrangement 100 as discussed in the above. The software component arrangement 600 comprises a user interface of a visual data presenting arrangement 100 comprising an image presenting device 110 arranged to display visual data comprising graphical objects 105A-D in a first manner, wherein the software component arrangement 600 comprises: a software component for receiving 610 a determination of eyewear 210 presence from a non-visual eyewear detector 112; and a software component for adapting 640 the user interface of the visual data presenting arrangement 100 by displaying one or more of the graphical objects 105A-D in a second manner in response thereto.

For the context of the teachings herein a software component may be replaced or supplemented by a software module.

Figure 7:
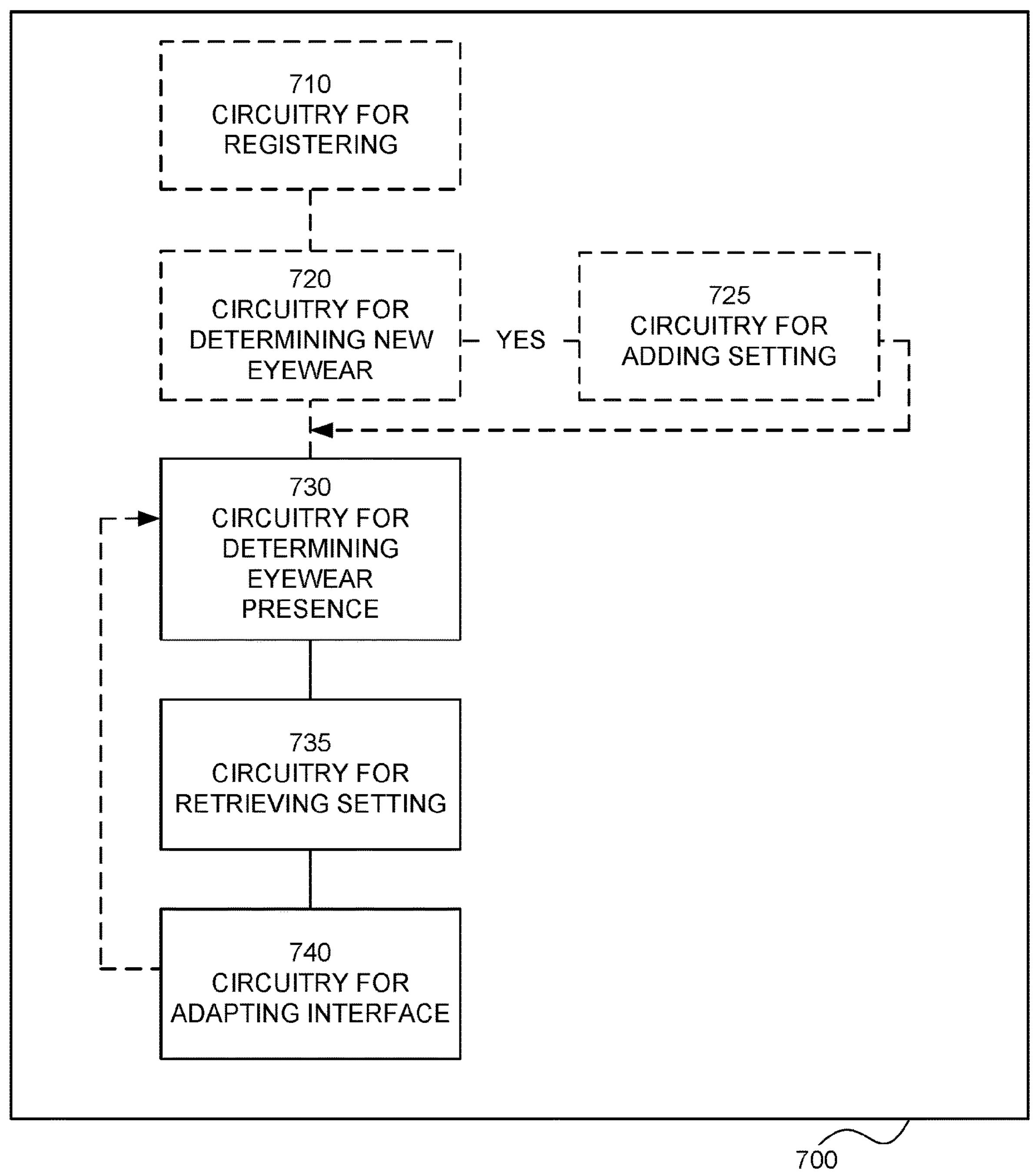
FIG. 7 shows a component view for an arrangement comprising circuits according to an embodiment of the teachings herein.

FIG. 7 shows a component view for an arrangement comprising circuitry for presenting visual data 700 according to an embodiment of the teachings herein. The arrangement comprising circuitry for presenting visual data 700 is adapted to be used in a visual data presenting arrangement 100 as taught herein for providing adaptation of a user interface and corresponds to the operation of the visual data presenting arrangement 100 as discussed in the above. The visual data presenting arrangement 700 of FIG. 7 comprising an image presenting device 110 arranged to display visual data comprising graphical objects 105A-D in a first manner and circuitry for adapting a user interface comprising: circuitry for receiving 710 a determination of eyewear 210 presence from a non-visual eyewear detector 112; and circuitry for adapting 740 the user interface of the visual data presenting arrangement 100 by displaying one or more of the graphical objects 105A-D in a second manner in response thereto.

Figure 8:
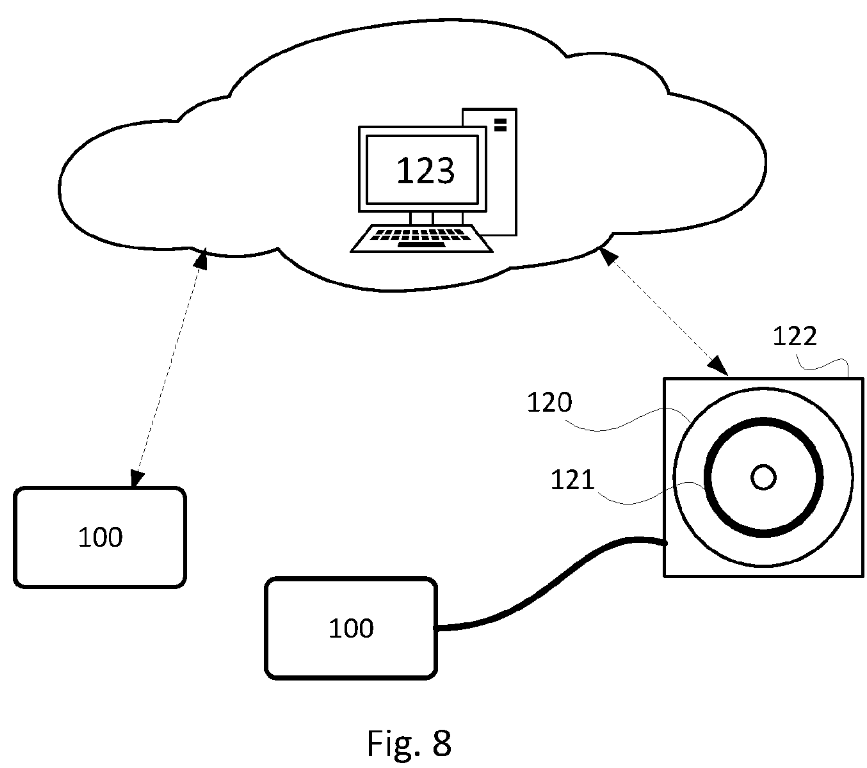
FIG. 8 shows a schematic view of a computer-readable medium carrying computer instructions that when loaded into and executed by a controller of an arrangement enables the arrangement to implement an embodiment of the present invention.

FIG. 8 shows a schematic view of a computer-readable medium 120 carrying computer instructions 121 that when loaded into and executed by a controller of a visual data presenting arrangement 100 enables the visual data presenting arrangement 100 to implement the teachings herein.

The computer-readable medium 120 may be tangible such as a hard drive or a flash memory, for example a USB memory stick or a cloud server. Alternatively, the computer-readable medium 120 may be intangible such as a signal carrying the computer instructions enabling the computer instructions to be downloaded through a network connection, such as an internet connection.

In the example of FIG. 8, a computer-readable medium 120 is shown as being a computer disc 120 carrying computer-readable computer instructions 121, being inserted in a computer disc reader 122. The computer disc reader 122 may be part of a cloud server 123—or other server—or the computer disc reader may be connected to a cloud server 123—or other server. The cloud server 123 may be part of the internet or at least connected to the internet. The cloud server 123 may alternatively be connected through a proprietary or dedicated connection. In one example embodiment, the computer instructions are stored at a remote server 123 and be downloaded to the memory 102 of the visual data presenting arrangement 100 for being executed by the controller 101.

The computer disc reader 122 may also or alternatively be connected to (or possibly inserted into) a visual data presenting arrangement 100 for transferring the computer-readable computer instructions 121 to a controller of the visual data presenting arrangement 100 (presumably via a memory of the visual data presenting arrangement 100).

FIG. 8 shows both the situation when a visual data presenting arrangement 100 receives the computer-readable computer instructions 121 via a server connection and the situation when another visual data presenting arrangement 100 receives the computer-readable computer instructions 121 through a wired interface. This enables for computer-readable computer instructions 121 being downloaded into a visual data presenting arrangement 100 thereby enabling the visual data presenting arrangement 100 to operate according to and implement the invention as disclosed herein.

The invention claimed is:

1. A visual data presenting arrangement comprising:
- an image presenting device comprising one or more displays and configured to display visual data comprising graphical objects on the one or more displays; and
- controller circuitry configured to:
  - receive, from a non-visual eyewear detector, a determination of whether or not eyewear through which to view the one or more displays is present; and
  - adapt a user interface of the visual data presenting arrangement by adapting a manner in which one or more of the graphical objects are displayed on the one or more displays between a first manner of display and a second manner of display, depending respectively on whether or not eyewear is present according to the determination.

2. The visual data presenting arrangement according to claim 1, wherein the non-visual eyewear detector is non-visual in that the non-visual eyewear detector is configured to make the determination of eyewear presence without an image analysis.

3. The visual data presenting arrangement according to claim 1, wherein the controller circuitry is further configured to register eyewear whose presence is determined by the non-visual eyewear detector.

4. The visual data presenting arrangement according to claim 1, wherein the non-visual eyewear detector is configured to make the determination by receiving an indicating signal that indicates whether or not eyewear through which to view the one or more displays is present.

5. The visual data presenting arrangement according to claim 4, wherein the indicating signal is received by the non-visual eyewear detector from an identifying component on eyewear whose presence is determined by the non-visual eyewear detector.

6. The visual data presenting arrangement according to claim 5, wherein the eyewear comprises a storage container arranged with the identifying component.

7. The visual data presenting arrangement according to claim 4, wherein the indicating signal is received by the non-visual eyewear detector from another visual data presenting arrangement.

8. The visual data presenting arrangement according to claim 1, wherein the first manner of display and the second manner of display differ in terms of one or more of:
- the number of one or more of the graphical objects being displayed;
- a nature of one or more of the graphical objects being displayed;
- a text of one or more of the graphical objects being displayed;
- an arrangement of one or more of the graphical objects being displayed; or
- visual characteristics of one or more of the graphical objects being displayed.

9. The visual data presenting arrangement according to claim 8, wherein the first manner of display and the second manner of display differ in terms of the text of one or more of the graphical objects being displayed, wherein the first manner of display and the second manner of display differ in terms of:
- whether or not the text is displayed in an abbreviated form;
- whether or not keywords of the text are displayed;
- a format in which the text is displayed; or
- any combination thereof.

10. The visual data presenting arrangement according to claim 1, wherein the controller circuitry is further configured to adapt the user interface of the visual data presenting arrangement by adapting an audio component depending on whether or not eyewear is present according to the determination.

11. The visual data presenting arrangement according to claim 1, wherein the controller circuitry is further configured to adapt the user interface of the visual data presenting arrangement by adapting a vibrator depending on whether or not eyewear is present according to the determination.

12. The visual data presenting arrangement according to claim 1, wherein the controller circuitry is further configured to adapt the user interface of the visual data presenting arrangement by displaying the graphical objects in a corrective display based on eyewear being present according to the determination.

13. The visual data presenting arrangement according to claim 1, wherein the controller circuitry is further configured to adapt the user interface of the visual data presenting arrangement by adapting a device paired with the visual data presenting arrangement depending on whether or not eyewear is present according to the determination.

14. The visual data presenting arrangement according to claim 1, wherein the controller circuitry is further configured to adapt a user interface of another visual data presenting arrangement depending on whether or not eyewear is present according to the determination.

15. The visual data presenting arrangement according to claim 14, wherein the controller circuitry is further configured to adapt a user interface of another visual data presenting arrangement so that the user interface of another visual data presenting arrangement supplements the user interface of the visual data presenting arrangement.

16. A method for adapting a user interface of a visual data presenting arrangement comprising an image presenting device arranged to display visual data comprising graphical objects on one or more displays of the image presenting device, wherein the method comprises:

receiving, from a non-visual eyewear detector, a determination of whether or not eyewear through which to view the one or more displays is present; and adapting a user interface of the visual data presenting arrangement by adapting a manner in which one or more of the graphical objects are displayed on the one or more displays between a first manner of display and a second manner of display, depending respectively on whether or not eyewear is present according to the determination.

17. A non-transitory computer-readable medium on which is stored computer instructions that, when loaded into and executed by a controller of a visual data presenting arrangement, causes the visual data presenting arrangement to:

display, on one or more displays of an image presenting device, visual data comprising graphical objects;

receive, from a non-visual eyewear detector, a determination of whether or not eyewear through which to view the one or more displays is present; and adapt a user interface of the visual data presenting arrangement by adapting a manner in which one or more of the graphical objects are displayed on the one or more displays between a first manner of display and a second manner of display, depending respectively on whether or not eyewear is present according to the determination.

18. The non-transitory computer-readable medium of claim 17, wherein the first manner of display and the second manner of display differ in terms of one or more of:

the number of one or more of the graphical objects being displayed;

a nature of one or more of the graphical objects being displayed;

a text of one or more of the graphical objects being displayed;

an arrangement of one or more of the graphical objects being displayed; or visual characteristics of one or more of the graphical objects being displayed.

19. The non-transitory computer-readable medium of claim 18, wherein the first manner of display and the second manner of display differ in terms of the text of one or more of the graphical objects being displayed, wherein the first manner of display and the second manner of display differ in terms of:

whether or not the text is displayed in an abbreviated form;

whether or not keywords of the text are displayed;

a format in which the text is displayed; or any combination thereof.

20. The non-transitory computer-readable medium of claim 17, wherein the computer instructions cause the visual data presenting arrangement to, based on the determination being that eyewear through which to view the one or more displays is present, adapt the manner in which one or more of the graphical objects are displayed from the second manner of display to the first manner of display, wherein at least one of:

the first manner of display displays a reduced number of graphical objects as compared to the second manner of display;

the first manner of display displays one or more of the graphical objects with an increased size as compared to the second manner of display;

the first manner of display displays text of one or more of the graphical objects with a shorter length as compared to the second manner of display; and the first manner of display displays text of one or more of the graphical objects with an increased size as compared to the second manner of display.

21. The visual data presenting arrangement according to claim 1, wherein the controller circuitry is configured to, based on the determination being that eyewear through which to view the one or more displays is present, adapt the manner in which one or more of the graphical objects are displayed from the second manner of display to the first manner of display, wherein at least one of:

the first manner of display displays a reduced number of graphical objects as compared to the second manner of display;

the first manner of display displays one or more of the graphical objects with an increased size as compared to the second manner of display;

the first manner of display displays text of one or more of the graphical objects with a shorter length as compared to the second manner of display; and the first manner of display displays text of one or more of the graphical objects with an increased size as compared to the second manner of display.

22. The visual data presenting arrangement of claim 1, the eyewear having a first prescription, and wherein the controller circuitry is configured to adapt the manner in which one or more of the graphical objects are displayed by one or more of:

adapting the number of one or more of the graphical objects being displayed;

adapting a structure of a menu system being displayed; or adapting an arrangement of one or more of the graphical objects being displayed.

23. The visual data presenting arrangement of claim 1, wherein the controller circuitry is configured to select, from the first and second manners of display, the manner in which one or more of the graphical objects are to be displayed on the one or more displays, based on whether or not eyewear is present according to the determination, wherein the controller circuitry is configured to:

select the first manner of display if eyewear is present according to the determination; and select the second manner of display if eyewear is not present according to the determination.

24. The visual data presenting arrangement of claim 1, wherein the received determination of whether or not eyewear through which to view the one or more displays is present is a determination of whether or not non-display eyewear, separate from the one or more displays, is present.

25. The visual data presenting arrangement of claim 1, wherein the received determination of whether or not eyewear through which to view the one or more displays is present is a determination of whether or not eyewear that corrects a person's vision when viewing the one or more displays is present.

26. The visual data presenting arrangement of claim 1, wherein the received determination of whether or not eyewear through which to view the one or more displays is present is a determination of whether or not eyewear is present in a vicinity of the image presenting device as detected by the non-visual eyewear detector detecting that the eyewear is within radio frequency signal range of the image presenting device.

* * * * *